(12) United States Patent
Harada et al.

(10) Patent No.: US 8,264,649 B2
(45) Date of Patent: Sep. 11, 2012

(54) LIQUID CRYSTAL DEVICE AND METHOD OF MANUFACTURING LIQUID CRYSTAL DEVICE HAVING SURFACE GROOVES AND ALIGNMENT FILM WITH IMPROVED THICKNESS UNIFORMITY

(75) Inventors: Norihito Harada, Azumino (JP); Hayato Kurasawa, Matsumoto (JP); Toshinori Uehara, Matsumoto (JP); Masahiro Kosuge, Suwa (JP)

(73) Assignee: Sony Corporation, Tokyo (JP)

( * ) Notice: Subject to any disclaimer, the term of this patent is extended or adjusted under 35 U.S.C. 154(b) by 551 days.

(21) Appl. No.: 11/512,101

(22) Filed: Aug. 30, 2006

(65) Prior Publication Data
US 2007/0064184 A1  Mar. 22, 2007

(30) Foreign Application Priority Data

Sep. 16, 2005  (JP) ................. 2005-269657

(51) Int. Cl.
*G02F 1/1333* (2006.01)
*G02F 1/1335* (2006.01)
*G02F 1/1337* (2006.01)

(52) U.S. Cl. .............. 349/138; 349/114; 349/124

(58) Field of Classification Search .......... 349/113–115, 349/122, 123, 138, 106–109, 124, 129, 187; 438/30
See application file for complete search history.

(56) References Cited

U.S. PATENT DOCUMENTS

| | | | |
|---|---|---|---|
| 5,270,846 A * | 12/1993 | Watanabe et al. | 349/138 |
| 5,499,123 A * | 3/1996 | Mikoshiba | 349/110 |
| 5,943,105 A * | 8/1999 | Fujikawa et al. | 349/140 |
| 6,124,909 A * | 9/2000 | Miyashita et al. | 349/109 |
| 6,587,178 B2 * | 7/2003 | Jie et al. | 349/114 |
| 7,102,713 B2 * | 9/2006 | Nam et al. | 349/114 |
| 7,102,717 B2 * | 9/2006 | Chang et al. | 349/138 |
| 7,477,346 B2 * | 1/2009 | Wachi | 349/114 |
| 7,480,022 B2 * | 1/2009 | Tsuchiya et al. | 349/123 |
| 2001/0022640 A1 * | 9/2001 | Nakahara | 349/149 |
| 2004/0125290 A1 * | 7/2004 | Nam et al. | 349/114 |
| 2005/0001962 A1 * | 1/2005 | Maeda | 349/114 |
| 2005/0016259 A1 | 1/2005 | Zachary et al. | |
| 2005/0128396 A1 * | 6/2005 | Tsuchiya et al. | 349/123 |
| 2005/0140876 A1 * | 6/2005 | Kubo | 349/114 |
| 2005/0162597 A1 * | 7/2005 | Wachi | 349/138 |

FOREIGN PATENT DOCUMENTS

| | | |
|---|---|---|
| JP | A 2004-54129 | 2/2004 |
| JP | A 2004-102243 | 4/2004 |
| JP | A 2004-139056 | 5/2004 |

(Continued)

*Primary Examiner* — Mark Robinson
*Assistant Examiner* — Paisley L Arendt
(74) *Attorney, Agent, or Firm* — K&L Gates LLP (57) ABSTRACT

A liquid crystal device includes a pair of substrates, liquid crystal sandwiched between the pair of substrates, and a plurality of sub-pixels. Each sub-pixel has a transmissive display region and a reflective display region. One of the substrates has a color filter and a transparent insulating film disposed on the color filter. The transparent insulating film has a thin-walled portion provided in the transmissive display region and a region along a boundary between the adjacent sub-pixels. At least a portion of a region in which the thin-walled portion of the transparent insulating film is not provided overlaps the reflective display region. The layer thickness of the liquid crystal in the reflective display region is smaller than the layer thickness of the liquid crystal in the transmissive display region in consideration of the thin-walled portion.

15 Claims, 9 Drawing Sheets

FOREIGN PATENT DOCUMENTS

| | | |
|---|---|---|
| JP | A 2004-157148 | 6/2004 |
| JP | A 2004-325822 | 11/2004 |
| JP | A 2004-354507 | 12/2004 |
| JP | A-2005-242302 | 9/2005 |
| JP | A 2006-72190 | 3/2006 |
| JP | A-2006-292940 | 10/2006 |

* cited by examiner

LIQUID CRYSTAL DEVICE AND METHOD OF MANUFACTURING LIQUID CRYSTAL DEVICE HAVING SURFACE GROOVES AND ALIGNMENT FILM WITH IMPROVED THICKNESS UNIFORMITY

BACKGROUND

The present invention relates to a liquid crystal device, a method of manufacturing the liquid crystal device, and an electronic apparatus, and more specifically, to the structure of a liquid crystal device having an alignment film for aligning liquid crystal, and a method of manufacturing the liquid crystal device.

Generally, a liquid crystal device has a cell structure in which liquid crystal is enclosed between a pair of substrates, and an alignment film which regulates an initial aligned state of liquid crystal is formed in the inner surface of each substrate. As a method of forming an alignment film, the alignment film is formed, for example, by coating uncured resin, such as polyimide, on the inner surface of a substrate by a spin coating method, a printing method, etc., and performing drying or baking, etc.

Meanwhile, according to the type of display of liquid crystal devices, there are a transmissive liquid crystal device which causes illuminating light, such as back light, to be transmitted, thereby performing display, and a reflective liquid crystal device which causes outdoor daylight, etc. to be reflected, thereby performing display with reflected light. In particular, a transflective liquid crystal device which enables both the transmissive display and reflective display is often mounted in portable electronic apparatuses. This transflective liquid crystal device has the structure in which pixels each having a light-transmitting region which enables the transmissive display with the back light, and a light-reflecting region which enables the reflective display with outdoor daylight are arranged within an effective driving region.

In the above transflective liquid crystal device, the reflected light which constitutes the reflective display passes through a liquid crystal layer just one time, whereas the transmitted light which constitutes the transmissive display passes through the liquid crystal layer reciprocally two times. Therefore, the degrees (retardation) of light modulation of the liquid crystal layer to the display lights will differ greatly in the transmissive display and reflective display. For this reason, in order to reduce a difference in the light modulation in the transmissive display and reflective display, the thickness of the liquid crystal layer in a light-reflecting region is generally made smaller than the thickness of the liquid crystal layer in a light-transmitting region.

Specifically, the thickness of the liquid crystal layer is controlled by partially forming a transparent insulating film on the inner surface of a substrate. That is, the transparent insulating film is formed in the light-reflecting region of a pixel, and the transparent insulating film is not formed in the light-transmitting region so that the thickness of the liquid crystal layer sandwiched between a pair of substrates may differ in the light-reflecting region and the light-transmitting region.

However, the above transflective liquid crystal device has problems in that, since the transparent insulating film is partially formed on the substrate, when an uncured alignment resin is coated on the substrate, the alignment resin is accumulated in a non-formation region (light-transmitting region) of the transparent insulating film, and this invites any thickness unevenness of the alignment film, which deteriorates display quality. Thus, a technique of continuously forming a concave light-transmitting region between adjacent pixels to increase the flowability of alignment resin, thereby reducing any thickness unevenness of the alignment resin, is proposed (for example, refer to JP-A No. 2004-325822 (particularly, FIGS. 3, 13, or 17).

However, with the above-mentioned liquid crystal device, since the concave light-transmitting region continues between pixels, the thickness unevenness of the alignment resin in the light-transmitting region is not sufficiently solved sometimes, though the flowability of the alignment resin improves. For example, in a case in which a transparent insulating film is formed in such a pattern that a light-reflecting region is continuous between pixels, a continuous light-reflecting region is interposed between continuous light-transmitting regions. Thus the thickness of the alignment resin which has flowed into the region from the light-reflecting region may vary in a direction in which the light-transmitting regions continue. In particular, any thickness unevenness of the alignment resin may occur at the peripheral edges of the light-transmitting regions near the light-reflecting region, which deteriorates display quality. Further, in a case in which alignment resin is coated by a printing method, any deterioration of display quality is sometimes inevitable depending on the relationship between a print direction and a continuation direction of light-transmitting regions.

Meanwhile, an example in which a light-reflecting region in the shape of an island is formed in every pixel is also disclosed in the above-mentioned liquid crystal device. In this case, since a grooved recess is formed also between light-reflecting regions of each pixel, it is considered that alignment resin can flow in all directions, and consequently any thickness unevenness of the alignment resin is reduced. However, in this case, since the distance of the peripheral edge becomes large compared with the area of the light-reflecting region, there is a problem in that any poor alignment of liquid crystal is apt to occur due to a level difference generated at the peripheral edge of the light-reflecting region, and consequently the display quality gets worse.

SUMMARY

An advantage of the invention is that it provides a liquid crystal device capable of suppressing obstruction of flow of alignment resin by a transparent insulating film to suppressing deterioration of the display quality resulting from any thickness unevenness of the alignment resin, and suppressing deterioration of the display quality resulting from any poor alignment of liquid crystal at the peripheral edge of the transparent insulating film.

According to an aspect of the invention, a liquid crystal device includes a pair of substrates, liquid crystal sandwiched between the pair of substrates, and a plurality of sub-pixels. Each sub-pixel has a transmissive display region and a reflective display region. One of the substrates has a color filter and a transparent insulating film disposed on the color filter. The transparent insulating film has a thin-walled portion provided in the transmissive display region and a region along a boundary between the adjacent sub-pixels. At least a portion of a region in which the thin-walled portion of the transparent insulating film is not provided overlaps the reflective display region. The layer thickness of the liquid crystal in the reflective display region is smaller than the layer thickness of the liquid crystal in the transmissive display region in consideration of the thin-walled portion.

According to a further aspect of the invention, since a surface groove is formed in a transparent insulating film by providing a thin-walled portion along a boundary between adjacent sub-pixels in the transparent insulating film, the flowability of an alignment material can be improved. It is thus possible to prevent deterioration of the display quality resulting from any thickness unevenness of an alignment film. Also, since this surface groove is constructed from the thin-walled portion of the transparent insulating film so that it may not reach a ground surface, any poor alignment of the liquid crystal at the peripheral edge which faces the surface groove of the transparent insulating film can be suppressed. Therefore, deterioration of the display quality resulting from any poor alignment of the liquid crystal caused by formation of the surface groove can be reduced. Also, deterioration of the display quality resulting from any poor alignment of the liquid crystal can be further reduced by forming a thin-walled portion along a boundary between sub-pixels on the boundary. In particular, deterioration of the display quality resulting from any poor alignment of liquid crystal can be more reliably prevented by providing a light-shielding structure, such as a light-shielding film or an overlapping portion of different colors of a color filter, in a position where it overlaps a boundary between sub-pixels in plan view.

In this aspect of the invention, preferably, the transmissive display region is provided in the shape of an island within the pixels, and the periphery of the transmissive display region is surrounded by the reflective display region. In a case in which the transmissive display is provided in the shape of an island as such, the transmissive display region is not continuous between adjacent sub-pixels. Thus, the effect obtained by a surface groove constructed from the thin-walled portion provided between the adjacent sub-pixels becomes very excellent.

Further, according to another aspect of the invention, a liquid crystal device includes a pair of substrates, liquid crystal sandwiched between the pair of substrates, and a plurality of sub-pixels arranged in a row direction and a column direction. Each sub-pixel has a transmissive display region and a reflective display region. One of the substrates has a color filter and a transparent insulating film disposed on the color filter. At least a portion of the transparent insulating film has a thin-walled portion overlapping the transmissive display region. The thin-walled portion is provided in a region along a boundary between the adjacent sub-pixels in the row direction and a region along a boundary between the adjacent sub-pixels in the column direction. At least a portion of a region in which the thin-walled portion of the transparent insulating film is not provided overlaps the reflective display region. The layer thickness of the liquid crystal in the reflective display region is smaller than the layer thickness of the liquid crystal in the transmissive display region in consideration of the thin-walled portion.

According to this aspect of the invention, since a thin-walled portion is provided also between adjacent sub-pixels in a row direction and a column direction, a still higher effect can be acquired.

In this aspect of the invention, preferably, the thin-walled portion provided in the region along the boundary between the sub-pixels forms a surface groove having a depth of 30% or more and 90% or less of the film thickness of the transparent insulating film. According to this, the flowability of an alignment material by the surface groove can be sufficiently increased, and any poor alignment of the liquid crystal at the peripheral edge of the transparent insulating film can be suppressed. That is, if the width is less than the above range, the effect of increasing the flowability of an alignment material is negligible. Further, if the width exceeds the above range, any poor alignment of the liquid crystal at the peripheral edge which faces the surface groove of the transparent insulating film is apt to occur. In particular, it is desirable that the depth of the surface groove is 40% or more and 80% or less of the film thickness of the transparent insulating film.

In a further aspect of the invention, preferably, the transparent insulating film has at least a double-layer structure, and the thin-walled portion provided in the region along the boundary between the sub-pixels is formed, leaving at least a lowermost layer. The depth of the surface groove can be easily controlled with high precision by constituting the transparent insulating film with two or more layers, leaving at least a lowermost layer of these layers. However, in this invention, the surface groove which reaches the middle of a single-layer transparent insulating film in its thickness direction may be formed in the thin-walled portion.

In a further aspect of the invention, preferably, the thin-walled portion provided in the region along the boundary between the sub-pixels is opened to the transmissive display region. When the surface groove provided in the thin-walled portion of the transparent insulating film is opened to the transmissive display region, an alignment material which has flowed into the surface groove from the transparent insulating film (convex portion) can be made to flow directly into the transmissive display region (concave portion), and the flowability of the alignment material can be further improved. Therefore, any thickness unevenness of the alignment film can be further reduced.

In this aspect of the invention, preferably, the width of the thin-walled portion provided in the region along the boundary between the sub-pixels is within a range of 10 to 19 μm. According to this, a reduction in the thickness unevenness of the alignment film can be balanced with control of any poor alignment of the liquid crystal.

In this aspect of the invention, pixels including a plurality of the sub-pixels in which colored layers of a plurality of colors are disposed, respectively, are periodically arranged in the effective driving region, and thin-walled portions each provided in the region along the boundary between the adjacent sub-pixels are periodically arranged corresponding to an arrangement period of the pixels. In a color display liquid crystal device which has a color filter, since pixels are recognized as the minimum display unit, occurrence of any display unevenness can be prevented efficiently by providing thin-walled portions each provided in the region along the boundary between the adjacent sub-pixels so as to correspond to the pixels. That is, by forming surface grooves so as to correspond to pixels, the degree of freedom in the formation locations or formation density of the surface grooves can be increased compared with a case where a surface groove is formed in every pixel, while the uniformity of effects of the surface groove is ensured. Accordingly, a reduction in the thickness unevenness of the alignment film can be compatible with control of any poor alignment of the liquid crystal.

According to still another aspect of the invention, there is provided a method of manufacturing a liquid crystal device including a pair of substrates, liquid crystal sandwiched between the pair of substrates, and a plurality of sub-pixels. Each sub-pixel has a transmissive display region and a reflective display region. The manufacturing method includes: forming a color filter on one of the substrates; forming on the color filter a transparent insulating film which has a thin-walled portion provided in the transmissive display region and a region along a boundary between the adjacent sub-pixels, and in which at least a portion of a region in which the thin-walled portion is not provided overlaps the reflective display region; and disposing an uncured alignment material on an inner surface of the one substrate.

According to still another aspect of the invention, there is provided a method of manufacturing a liquid crystal device including a pair of substrates, liquid crystal sandwiched between the pair of substrates, and a plurality of sub-pixels arranged in a row direction and a column direction. Each sub-pixel has a transmissive display region and a reflective display region. The method includes: forming a color filter on one of the substrates; forming on the color filter a transparent insulating film which has a thin-walled portion provided in a region along a boundary between the adjacent sub-pixels in a row direction and a region along a boundary between the adjacent sub-pixels in a column direction, and in which at least a portion of a region in which the thin-walled portion is not provided overlaps the reflective display region; and disposing an uncured alignment material on an inner surface of the one substrate.

In this case, preferably, in the step of forming a transparent insulating film, the transparent insulating film and the thin-walled portion are formed by disposing photosensitive resin on the inner surface of the substrate, and subjecting exposure treatment and development treatment to the photosensitive resin.

Further, preferably, the step of forming a transparent insulating film includes forming a first transparent insulating layer in a region where the transparent insulating film is formed, and forming a second transparent insulating layer in a region on the first transparent insulating layer other than the thin-walled portion.

Further, preferably, the width of the thin-walled portion provided in the region along the boundary between the sub-pixels is within a range of 10 to 19 μm.

Next, according to yet another aspect of the invention, an electronic apparatus includes the liquid crystal device according to any one of the above aspects. Although the electronic apparatus of the invention is not limited particularly, it is effective to constitute the electronic apparatus as portable electronic apparatuses, such as a portable telephone, a personal digital assistant, and an electronic clock.

BRIEF DESCRIPTION OF THE DRAWINGS

The invention will be described with reference to the accompanying drawings, wherein like numbers reference like elements.

DETAILED DESCRIPTION OF EMBODIMENTS

Figure 7:
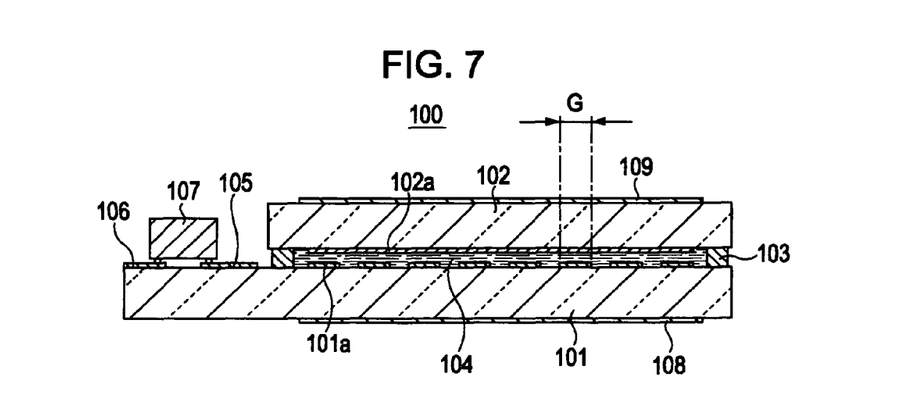
FIG. 7 is a schematic longitudinal sectional view of the liquid crystal device of the embodiment.
Figure 8:
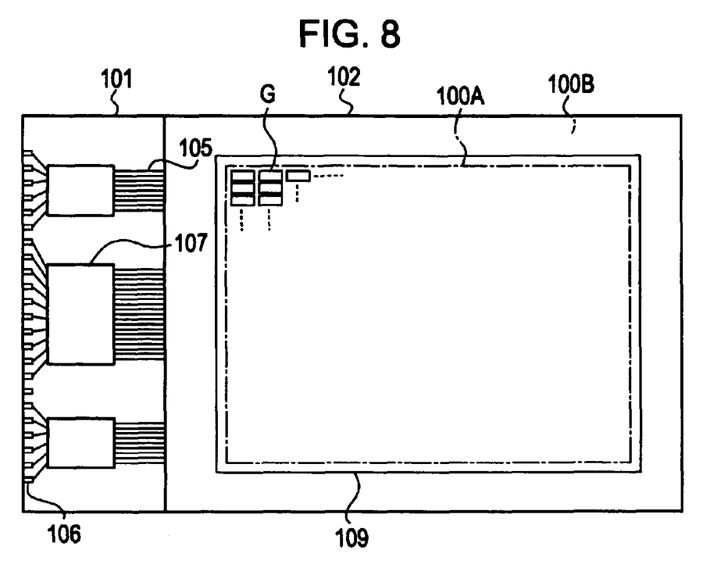
FIG. 8 is a schematic plan view of the liquid crystal device of the embodiment.

Next, embodiments of the invention will be described with reference to the accompanying drawings. FIG. 7 is a schematic longitudinal sectional view of a liquid crystal device according to an embodiment of the invention, and FIG. 8 is a schematic plan view of the embodiment. In addition, in order to show the structure clearly, vertical and horizontal dimensions are appropriately changed and some electrodes are appropriately omitted in each of the drawings attached to the present application.

The liquid crystal device 100 of this embodiment is configured such that a substrate 101 made of transparent raw materials, such as glass and plastics, and a substrate 102 disposed to face the substrate 101 are bonded together with sealant 103 therebetween, and liquid crystal 104 is enclosed between the substrates 101 and 102. Pixel electrodes 101a are formed on the substrate 101, and a common electrode 102a which faces the pixel electrodes 101a is formed on the substrate 102. In the illustrated example, the substrates 101 and 102 each have a rectangular (square or oblong) planar shape.

The substrate 101 is provided with a substrate overhang portion projecting further than the external shape of the substrate 102, and wiring lines 105, which are conductively connected to the pixel electrodes 101a or active elements (two-terminal switching elements, such as TFTs, three-terminal switching elements, such as TFDs, etc.) (not shown) connected to the pixel electrodes 101a, and the common electrode 102a, is led out on a surface of the substrate overhang portion. Also, input terminals 106 for inputting control signals and data signals from the outside are formed on the substrate overhang portion. Also, drive circuits 107 composed of semiconductor chips, etc. are mounted to the wiring lines 105 and the input terminals 106.

In addition, a polarizing plate 108 is disposed on an external surface of the substrate 101, and a polarizing plate 109 is disposed on an external surface of the substrate 102. Although the polarizing plates 108 and 109 are disposed according to the mode of a liquid crystal cell, the polarizing plates 108 and 109 are unnecessary in a case of a liquid crystal display which does not need any polarizing plates (for example, polymer-dispersion-type liquid crystal display).

An effective driving region 100A where the pixel electrodes 101a and the common electrode 102a are disposed to face each other is provided inside a liquid crystal enclosed region where the liquid crystal 104 is enclosed by the sealant 103, and sub-pixels G defined by the pixel electrodes 101a are arranged in a matrix in the vertical and horizontal directions in this effective driving region 100A. Also, a peripheral region 100B is provided between the effective driving region 100A and the sealant 103 so as to surround the effective driving region 100A in a frame shape. Here, the planar shape of the effective driving region 100A becomes a rectangular (square or oblong) shape.

Figure 1:
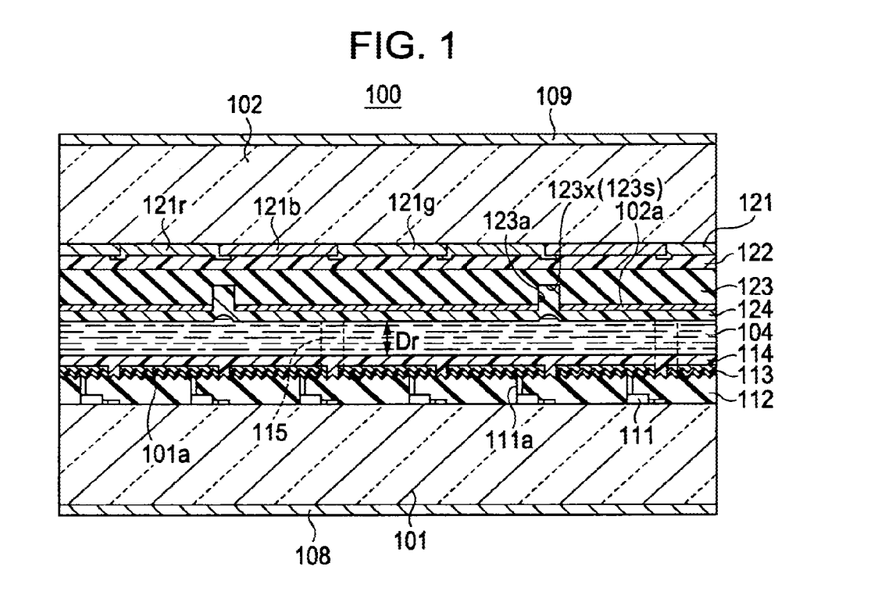
FIG. 1 is a partially enlarged longitudinal sectional view of a liquid crystal device of an embodiment (sectional view taken along line I-I of FIG. 3).
Figure 2:
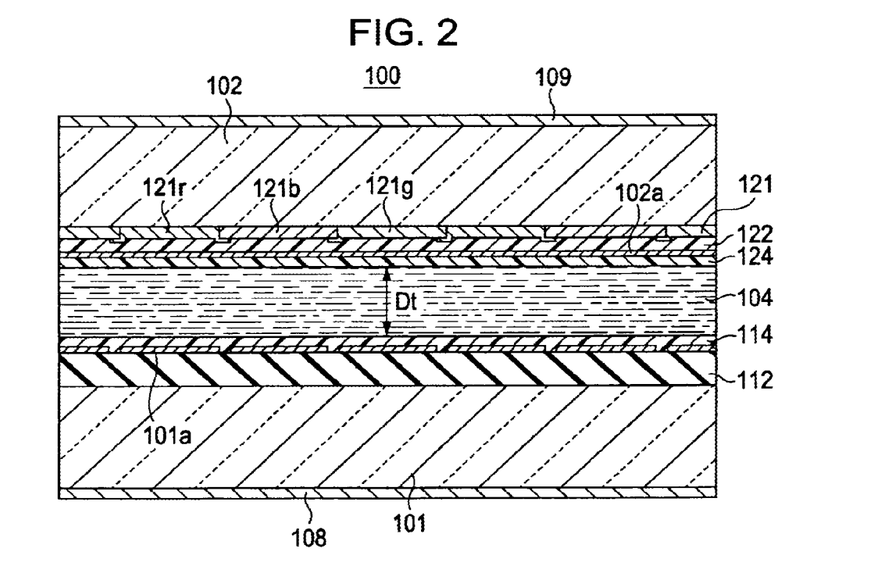
FIG. 2 is a partially enlarged longitudinal sectional view of the liquid crystal device of the embodiment (sectional view taken along line II-II of FIG. 3).
Figure 3:
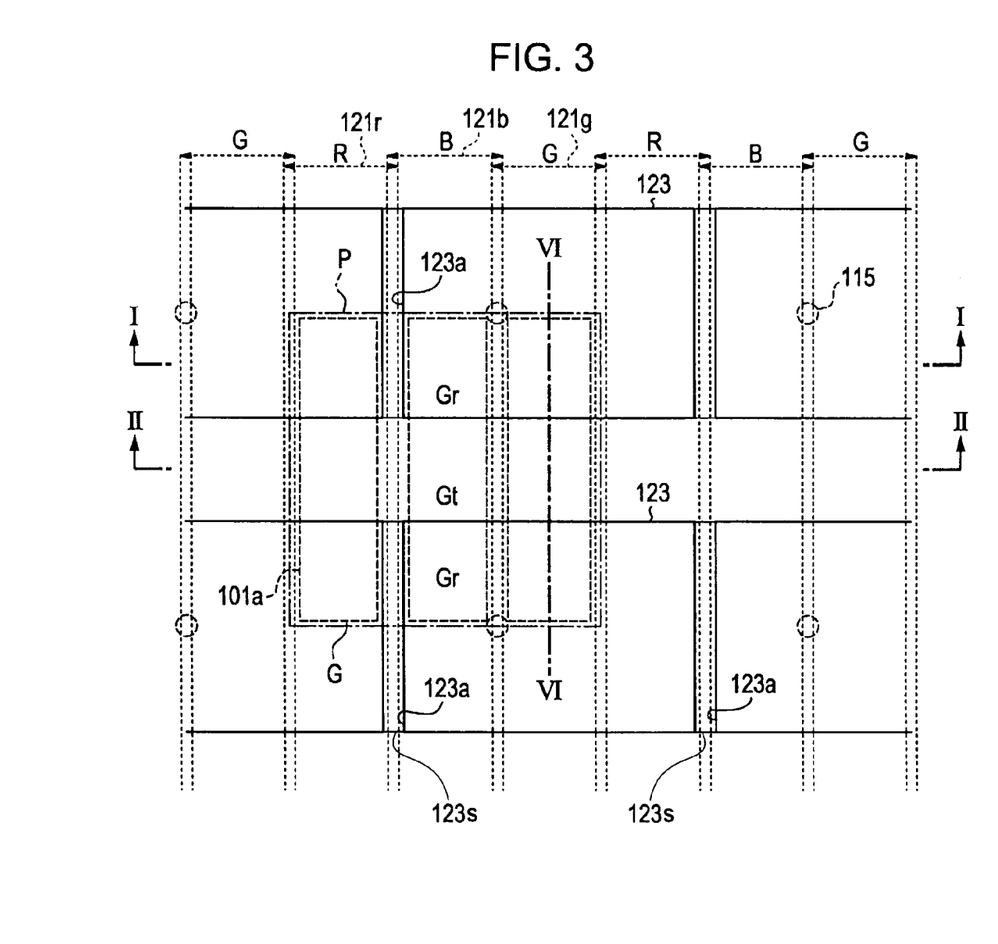
FIG. 3 is a plan view of a color filter substrate of the liquid crystal device of the embodiment.
Figure 6:
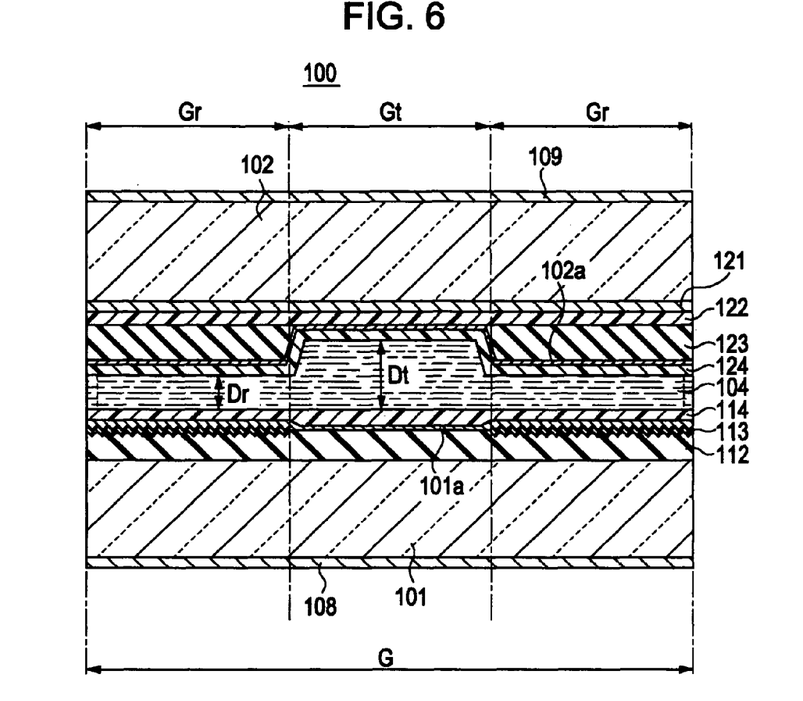
FIG. 6 is a partially enlarged longitudinal sectional view of the liquid crystal device of the embodiment (sectional view taken along line VI-VI of FIG. 3).

FIGS. 1 and 2 are enlarged longitudinal sectional views of the liquid crystal device according to the embodiment of the invention, FIG. 3 is a schematic enlarged plan view of a color filter substrate, and FIG. 6 is an enlarged longitudinal sectional view showing a section orthogonal to FIGS. 1 and 2. Here, a section taken along line I-I of FIG. 3 is shown in FIG. 1, a section taken along line II-II of FIG. 3 is shown in FIG. 2, and a section taken along line VI-VI of FIG. 3 is shown in FIG. 6. In addition, a portion (pixel electrodes and columnar spacers) of the structure provided on the side of the element substrate are also shown in FIG. 3.

In this embodiment, active elements 111 are formed on the substrate 101, and an underlying insulating film 112 is formed on the active elements 111. The active elements 111 are connected to wiring lines (not shown), for example, scanning lines and data lines, which intersect each other, in the case of three-terminal switching elements, such as TFTs. The underlying insulating film 112 is a transparent insulating film made of acrylic resin, etc., and a minute rugged structure is formed in a portion of the surface of the film by photolithography, etc. Then, by forming a reflective layer 113 made of reflective raw materials, such as Al and Cr, on the minute rugged structure of the underlying insulating film 112, the surface of the reflective layer 113 will be roughened that has the minute rugged structure reflected thereon.

On the reflective layer 113, the pixel electrodes 101a made of transparent conductive materials, such as indium tin oxide (ITO), are formed. The pixel electrodes 101a are conductively connected to the active elements 111 via contacts 111a, respectively. Specifically, in the illustrated example, the contacts 111a of the active elements 111 are conductively connected to the reflective layer 113, and the reflective layer 113 is conductively connected to the pixel electrodes 101a.

As shown in FIG. 6, the reflective layer 113 is formed in a portion of a sub-pixel G defined by the pixel electrodes 101a. Thereby, the sub-pixel G is provided with light-reflecting regions Gr composed of portions where the reflective layer 113 is formed, and a light-transmitting region Gt composed of a portion where the reflective layer 113 is not formed.

On the pixel electrodes 101a, an alignment film 114 made of polyimide resin, etc. is formed. The alignment film 114 regulates an initial aligned state (aligned state when an electric field of a threshold or higher is not applied) of the liquid crystal 104. For example, the alignment film functions to align liquid crystal molecules substantially vertically to the alignment film 114 in constituting a liquid crystal cell in a vertical alignment mode, and to align liquid crystal molecules substantially parallel to the alignment film 114 in constituting a liquid crystal cell in a TN mode.

On the underlying insulating film 112, columnar spacers 115 made of organic resin or inorganic compounds are formed. The columnar spacers 115 abut on the inner surface of the substrate 101, as will be described below, to regulate the thickness of the liquid crystal 104. Although the columnar spacers 115 are fixed on the inner surface of the substrate 101, they may be fixed on the inner surface of the substrate 102, or spacers in a free state which are not fixed to both the substrates may be used. The columnar spacers 115 are disposed so as to overlap the surface of a transparent insulating film 123 as will be described below. This can reduce the height of the columnar spacers 115.

On the inner surface of the substrate 102, colored layers 121r, 121b, and 121g of a plurality of colors which constitute a color filter 121 are formed. The colored layers 121r, 121b, and 121g of a plurality of colors are arranged in a predetermined pattern in the color filter 121, and in the illustrated example, they constitute a stripe arrangement in which each colored layer extends in a stripe. However, the colored layers are arranged in other patterns, such as a delta arrangement and an inclined mosaic arrangement. Also, although three colors of the red colored layer 121r, blue colored layer 121b, and green colored layer 121g are arranged periodically in the illustrated example, colored layers having combinations of other colors, such as cyan, magenta, and yellow, may be used. Each colored layer is formed by coating a mixture obtained by dispersing colorants, such as pigments and dyes, in a resin base material by a printing method, a spin coating method, a roll coating method, etc., and patterning it by photolithography, etc. In particular, it is preferable that each colored layer be directly formed by performing exposure and development using photosensitive resin as a coloring material. A transparent protective film 122 is formed on the colored layers 121r, 121b and 121g of the color filter 121. The transparent protective film 122 is made of acrylic resin etc. to prevent deterioration of the colored layers and planarize the surface of the color filter 121.

On the transparent protective film 122, a transparent insulating film 123 is partially formed. The transparent insulating film 123 is not formed in the light-transmitting region Gt, but is formed in the light-reflecting regions Gr. The transparent protective film 123 can be made of acrylic resin or a transparent inorganic film ($SiO_2$, $TiO_2$, etc.). Here, when facilitation of patterning is taken into consideration, it is desirable that the transparent protective film be formed by patterning photosensitive resin using photolithography.

On the transparent protective film 122 and the transparent insulating film 123, a common electrode 102a made of transparent conductive materials, such as ITO, is formed. If the active elements 111 are three-terminal switching elements, the common electrode 102a is formed as a planar electrode pattern, and if the active elements 111 are two-terminal switching elements, the common electrode is formed as a plurality of belt-like electrode patterns formed in stripes.

On the common electrode 102a, an alignment film 124 made of polyimide resin, etc. is formed. The alignment film 124 is the same as the alignment film 114, and has a given capability of aligning the liquid crystal 104 if necessary. The alignment film 124 is formed by coating uncured alignment resin on a substrate by a printing method, a spin coating method, a roll coating method, etc., and performing drying or baking treatment thereon.

In this embodiment, as shown in FIG. 6, a thickness Dt of the liquid crystal 104 in the light-transmitting region Gt and a thickness Dr of the liquid crystal 104 in the light-reflecting region Gr are made different from each other depending on existence/nonexistence of the transparent insulating film 123. That is, the thickness Dt is greater than the thickness Dr. In particular, it is preferable that the thickness Dt be about 1.5 to 2.0 times the thickness Dr. As a result, since the difference between the degree of light modulation of the liquid crystal 104 to reflected light and the degree of light modulation of the liquid crystal 104 to transmitted light can be reduced, a difference in display mode between the reflective display and the transmissive display can be reduced.

As shown in FIG. 3, in this embodiment, sub-pixel G in which different colored layers 121r, 121b, and 121g (dotted line in the figure) are disposed, respectively, are repeatedly arranged in the right-and-left direction in the figure. Here, all the sub-pixels G each corresponding to the colored layers of a plurality of colors included in the color filter 121, that is, a sub-pixel G in which the colored layer 121r is disposed, a sub-pixel G in which the colored layer 121b is disposed, and a sub-pixel G in which the colored layer 121g is disposed, constitute one pixel P. This pixel P constitutes a minimum display unit in the transmissive display and reflective display which will be performed by the liquid crystal device 100.

Transmissive regions Gt or reflective regions Gr are continuously formed in the arrangement direction (right-and-left direction in the figure) of a plurality of sub-pixels G arranged in each pixel P. Thereby, since convex portions or concave portions made of the transparent insulating film 123 are continuously formed over a plurality of pixels, the flowability of alignment resin as will be described below can be increased during coating of the alignment resin, and any thickness unevenness of the alignment film 124 can be reduced.

In each sub-pixel G, the light-transmitting region Gt and the light-reflecting region Gr are arranged sequentially in a direction orthogonal to the arrangement direction. In this embodiment, light-reflecting regions Gr are respectively disposed on both sides of one sub-pixel G in the direction orthogonal to the arrangement direction, and the light-transmitting region Gt is disposed between the light-reflecting regions Gr. Also, light-reflecting regions Gr are formed continuously between adjacent sub-pixels G in the direction orthogonal to the arrangement direction. That is, the transparent insulating film 123 is integrally formed between adjacent sub-pixels G in the direction orthogonal to the arrangement direction.

As shown in FIGS. 1 and 3, surface grooves 123a are formed in the transparent insulating film 123. Each surface groove 123a is formed in the shape of a slit extending in a predetermined direction on the surface of the transparent insulating film 123. The surface groove 123a is always formed in the same position in the pixel P. Specifically, the surface groove is formed so as to extend along a boundary between adjacent sub-pixels G in the arrangement direction, particularly along a boundary between the colored layers 121r and 121b.

All the surface grooves 123a are configured so as to be opened to light-transmitting regions Gt where the transparent insulating film 123 is not formed. That is, ends of each surface groove 123a are configured so as to face the light-transmitting regions Gt. More specifically, the surface groove 123a is configured such that it is opened to both non-formation portions (light-transmitting regions Gt) of the transparent insulating film 123 which exist on both sides of the surface groove through the transparent insulating film 123.

The surface groove 123a is configured such that it does not reach a ground surface (in the illustrated example, the surface of the transparent protective film 122 and generally the same surface as the surfaces of the non-formation portions (light-transmitting regions Gt) of the transparent insulating film 123) of the transparent insulating film 123. That is, an inner bottom portion 123x (refer to FIG. 1) of the surface groove 123a is in a position higher than the ground surface, and a portion of the transparent insulating film 123 exists below the inner bottom portion 123x.

This surface groove 123a constitutes a migration path which moves alignment resin in the direction (up-and-down direction of FIG. 3) orthogonal to the arrangement direction, when the alignment resin is coated on the substrate 102. Specifically, since the alignment resin on the surface (convex portion) of the transparent insulating film 123 flows into a non-formation portion (concave portion) of the transparent insulating film 123 through the surface groove 123a, the flowability of the alignment resin on the substrate 102 improves, and accordingly any thickness unevenness of the alignment film 124 is reduced. Particularly, in this embodiment, since the surface groove 123a is opened to the non-formation portion (concave portion) of the transparent insulating film 123, the alignment resin disposed on the transparent insulating film 123 can move smoothly to the non-formation portion (concave portion) of the transparent insulating film 123.

Also, since the surface groove 123a is provided in the direction orthogonal to the arrangement direction, the flowability of the alignment resin between the non-formation portions of the transparent insulating film 123 arranged with the surface groove 123a therebetween in the direction orthogonal to the arrangement direction. Accordingly, the uniformity of the alignment resin not only in the arrangement direction but also in the direction orthogonal to the arrangement direction can be improved.

In this embodiment, since the surface groove 123a basically is formed on the boundary between adjacent sub-pixels G, deterioration of the display quality caused by poor alignment of the liquid crystal 104 can be suppressed inherently. Moreover, in the illustrated example, since a light-shielding structure in which adjacent colored layers overlap each other on a boundary line between adjacent sub-pixels G is provided, poor alignment of the liquid crystal 104 hardly influences the display quality. In this case, the influence by poor alignment of the liquid crystal 104 can be further reduced by shielding a whole formation range of the surface groove 123a from light with the above light-shielding structure or other structures (for example, light-shielding film made of metal and black resin).

However, since the peripheral edge of the transparent insulating film 123 has a level difference required to change the thickness of the liquid crystal 104 in the light-reflecting region Gr and the light-transmitting region Gt, the poor alignment of the liquid crystal 104 inherently occurring at the peripheral edge of the transparent insulating film 123 can be prevented completely, and when the light-shielding structure is formed in a wide range, the brightness of display will be reduced. That is, since some poor alignment of the liquid crystal 104 caused by forming the surface groove 123a is inevitable, either the contrast of display or the brightness will be sacrificed from the relationship between the surface groove 123a and the light-shielding range.

However, in this embodiment, since the surface groove 123a is formed shallowly so as not to reach the ground surface as described above, the concave portion in the surface of the alignment film 124 reflecting the concave portion structure of the surface groove 123a can be made small. As a result, any poor alignment of the liquid crystal 104 caused by existence of the surface groove 123a can be reduced. That is, while the effect of improving the flowability of the alignment resin by the surface groove 123a is ensured, any poor alignment of the liquid crystal 104 caused by the surface groove 123a can be reduced.

Preferably, the width of the surface groove 123a is about 10 to 19 μm. If the width is less than this range, sufficient alignment resin cannot be made to flow and the effect resulting by provision of the surface groove 123a will be scarcely obtained. Also, if the width exceeds the above range, poor alignment of the liquid crystal 104 will increase due to a level difference generated in the alignment film 124 of the surface groove 123a, and it will become difficult to cover this increase by the above light-shielding structure. That is, if the width of the surface groove 123a is set to 20 μm or more, it is necessary to increase the width of the light-shielding structure as well.

Since this lowers the numerical aperture of pixels, it is difficult to ensure the brightness of display. In particular, since it is inherently difficult to ensure the brightness of display in the reflective display, a bad influence on the reflective display becomes remarkable.

The depth of the surface groove 123a, for example, is preferably within a range of 30% to 90% of the thickness of the transparent insulating film 123. In particular, the width is desirably within a range of 40% to 80%. Here, the standard thickness of the transparent insulating film 123 is generally about 1.0 to 3.0 μm, and preferably about 1.8 to 2.2 μm. If the depth of the surface groove 123a is smaller than the above range, the cross-sectional area of a surface groove cannot be sufficiently ensured and the flowability of alignment resin cannot be improved. On the other hand, if the depth of the surface groove 123a is greater than the range, poor alignment of the liquid crystal 104 at the peripheral edge facing the surface groove 123a of the transparent insulating film 123 will become remarkable. As a result, light leakage is caused and thereby the contrast of display is lowered.

Particularly, in this embodiment, since the surface groove 123a is formed on the boundary between the red colored layer 121r and the blue colored layer 121b, deterioration of the display quality caused by a surface level difference of the alignment film 124 resulting from existence of the surface groove 123a can be suppressed. That is, since red and blue colors of the three primary colors constituting the color filter 121 is negligible due to their low visibility, deterioration of the display quality caused by poor alignment of the liquid crystal 104 by the surface groove 123a can be suppressed by forming the surface groove 123a on a boundary line between the red and blue colors.

Also, in this embodiment, each of the columnar spacers 115 is disposed on the boundary between pixels, in which the surface groove 123a is not formed. Specifically, the columnar spacer 115 is disposed on the boundary line (an end of the boundary line) between the sub-pixel G in which the colored layer 121b is disposed, and the sub-pixel G in which the colored layer 121g is disposed. In this case, since the columnar spacer 115 does not overlap the surface groove 123a two-dimensionally, and the columnar spacer 115 abuts on an alignment film portion on the surface groove 123a, the degree of precision of regulation of the substrate interval by the columnar spacer 115 can be improved.

In this embodiment, although the surface groove 123a is formed only on the boundary between two sub-pixels G of the three sub-pixels G in the pixel P, a surface groove may also be formed on the boundary between other pixels. In this case, since the surface groove 123a increases, the flowability of the alignment film improves. However, since the length of the boundary between the transparent insulating film 123 and the surface groove 123a increases as well, deterioration of the display quality caused by any poor alignment of the liquid crystal 104 causes a problem. However, in this embodiment, since the surface groove 123a is shallowly formed so as not to reach the ground surface of the transparent insulating film 123, any influence caused by the poor alignment of the liquid crystal 104 resulting from the surface groove is suppressed. Accordingly, in this embodiment, the influence caused by increasing a portion where the surface groove 123 is formed is drastically reduced compared with a case where a surface groove is formed so as to reach the ground surface of the transparent insulating film 123.

Figure 9:
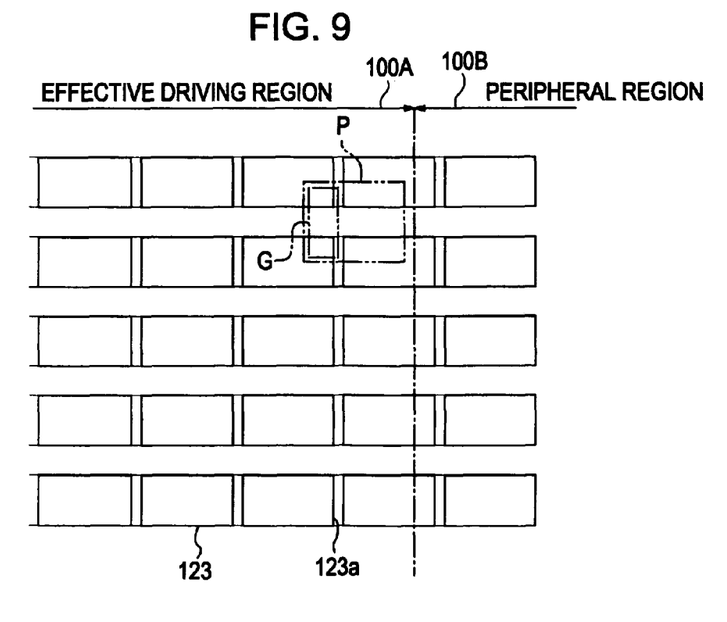
FIG. 9 is a schematic partial plan view showing the vicinity of a boundary portion between an effective driving region and a peripheral region in the embodiment.

FIG. 9 is a schematic plan view showing the vicinity of a boundary portion between the effective driving region 100A and the peripheral region 100B in this embodiment. Although the surface grooves 123a are periodically formed in predetermined portions of the transparent insulating film 123 in the effective driving region 100A as described above, at least one or more periods of periodical structures of the transparent insulating film 123 which has the surface grooves 123a in the peripheral region 100B like the effective driving region 100A are formed. In the illustrated example, the surface grooves 123a are arranged with the same period as the arrangement period of the pixels P, and are always provided in the same positions within the pixels P. Also, at least one same structure (transparent insulating film 123 and surface groove 123a formed therein) as the pixels P on the side of the effective driving region 100A is provided in the peripheral region 100B. Since this ensures the flowability of the alignment film at the peripheral edge of the effective driving region 100A like the central portion of the effective driving region 100A, occurrence of any display unevenness at the peripheral edge can be suppressed.

Figure 4A:
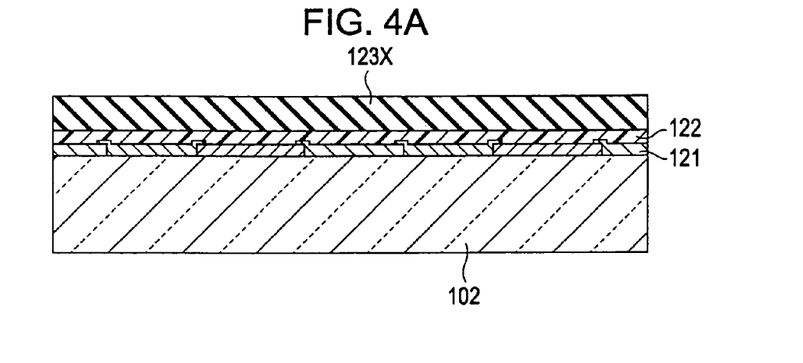
FIGS. 4A to 4C are explanatory views showing the processes of manufacturing the color filter substrate of the liquid crystal device of the embodiment.

FIGS. 4A to 4C are schematic explanatory views of steps illustrating essential features of a manufacturing method of the above embodiment. In this manufacturing method, as shown in FIG. 4A, the color filter 121 and the transparent protective film 122 are first formed on the inner surface of the substrate 102, and the uncured photosensitive resin 123X is coated on the transparent protective film. A printing method, a spin coating method, a roll coating method, etc. can be used as the coating method.

Figure 4B:
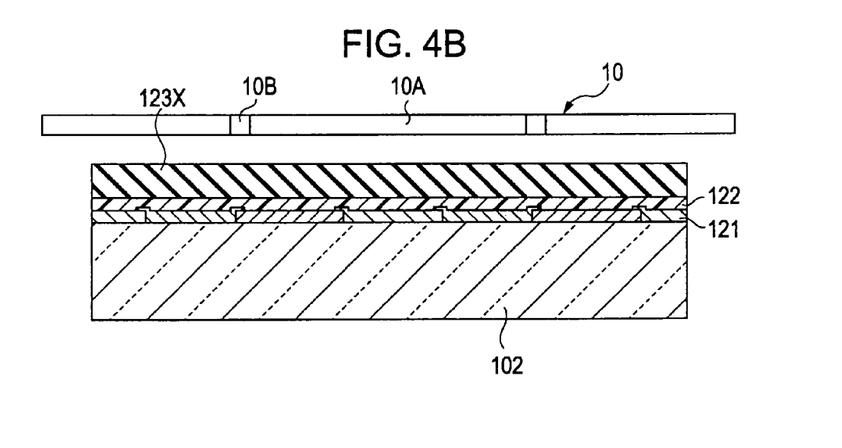

Next, as shown in FIG. 4B, the photosensitive resin 123X is exposed using a mask 10. The mask 10 is configured so as to form a first region 10A corresponding to a range in which the transparent insulating film 123 is formed, leaving the photosensitive resin 123X, a second region 10B corresponding to a range in which portions of the photosensitive resin 123X are removed to form the surface grooves 123a, and a third region (not shown) corresponding to a range in which the entire photosensitive resin 123X is removed to constitute the non-formation portions of the transparent insulating film 123. For example, in a case in which negative photosensitive resin is used as the mask 10, the first region 10A is constituted as a light-transmitting portion, the second region 10B is constituted as a transflective portion (halftone mask), and the third region 10C which is not shown is constituted as a light-shielding portion. For example, in a case in which positive photosensitive resin is used as the mask, contrary to the above, the first region 10A is constituted as a light-shielding portion, the second region 10B is constituted as a transflective portion (halftone mask), and the third region which is not shown is constituted as a light-transmitting portion.

Figure 4C:
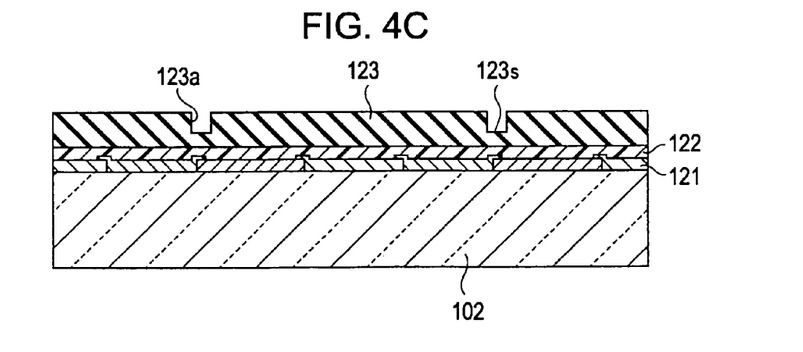

After the above exposure, the transparent insulating film 123 including the surface groove 123a shown in FIG. 4C is formed by performing development treatment with a developing solution and performing baking treatment, if necessary. By reducing exposing action in portions exposed by the transflective portion and reducing only portions on the side of the surface in the thickness direction by development treatment, the surface grooves 123a are formed in such a fashion that it does not reach the ground surface of the transparent insulating film 123. Also, although not shown, the photosensitive resin 123X is removed completely in a number of portions of the light-transmitting region Gt or the peripheral region 100B.

Figure 5A:
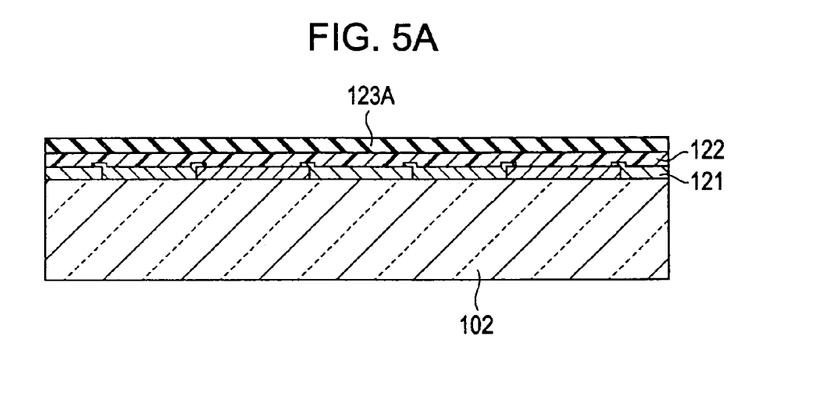
FIGS. 5A to 5C are explanatory views showing the processes of manufacturing the color filter substrate of the liquid crystal device of the embodiment.

FIGS. 5A to 5C are schematic explanatory views illustrating an example of other manufacturing methods. In this manufacturing method, the transparent insulating film 123 of double-layer structure is formed. That is, as shown in FIG. 5A, after the substrate 102, the color filter 121, and the transparent protective film 122 are formed, a first transparent layer 123A is formed on the transparent protective film. Although the first transparent layer 123A can be formed by various methods, after the layer is formed on the entire surface of the transparent protective film, the formation portions (light-reflecting regions) and non-formation portions (light-transmitting regions) of the first transparent layer 123A are provided by patterning by photolithography, etc.

Figure 5B:
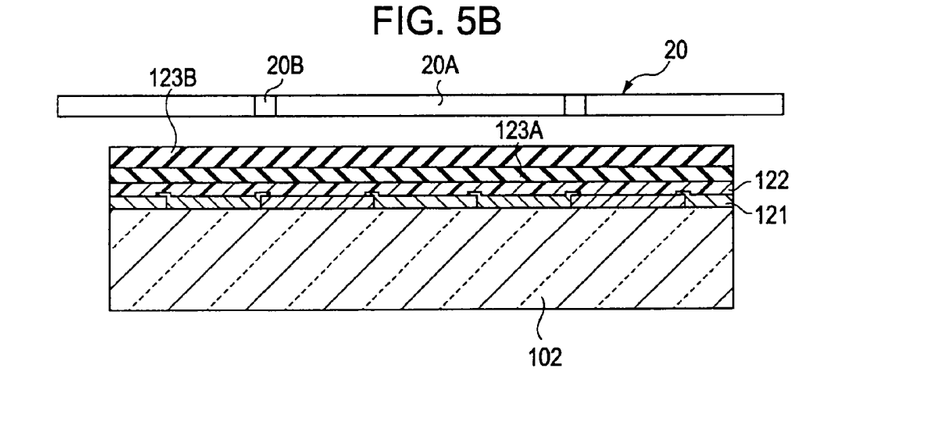
Figure 5C:
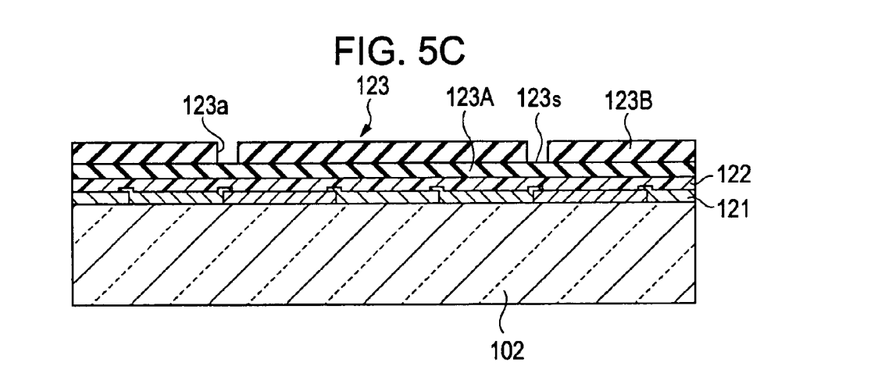

Next, as shown in FIG. 5B, a second transparent layer 123B is formed on the first transparent layer 123A. Thereafter, as shown in FIG. 5C, portions in which the second transparent layer 123B does not exist become the surface grooves 123*a* by patterning this second transparent layer 123B. For example, in a case in which photosensitive resin is used as the second transparent layer 123B, the photosensitive resin is coated, and then exposed using a mask 20 shown in FIG. 5B. Here, a first region 20A and a second region 20B are provided in the mask 20. Also, the portion corresponding to the second region 20B can be removed by using one of the first region 20A and the second region 20B as a light-shielding portion and using the other as a light-transmitting portion, according to the type of photosensitive resin.

However, the surface grooves 123*a* may be formed by forming a suitable etching mask on the second transparent layer 123B, and etching only exposed portions. In this case, it is preferable that the constituent material of the first transparent layer 123A be different from that of the second transparent layer 123B so that the first transparent layer 123A may become an etching stop layer.

In any of the manufacturing methods shown in FIGS. 4 and 5, after the transparent insulating film 123 is formed, the common electrode 102*a* is formed, and thereafter, the alignment film 124 is formed. The alignment film 124 is formed by coating an uncured alignment film by a printing method, a spin coating method, a roll coating method, etc., and drying or baking the coated alignment film. As a method of coating the alignment resin, particularly, coating using the printing method (for example, relief printing) is preferable in terms of manufacturing efficiency. In the structure of this embodiment, since the thickness unevenness of the alignment film 124 can be sufficiently reduced even when the printing method is used, high display quality without any display unevenness can be realized.

In the embodiment described above, only the transparent protective film 122 is formed in the light-transmitting region Gt, the transparent protective film 122 and a portion of the transparent insulating film 123 in the thickness direction is formed within the surface groove 123*a* of the light-reflecting region Gr, and both the transparent protective film 122 and the transparent insulating film 123 are laminated in portions other than surface groove 123*a* of the light-reflecting region Gr. Therefore, if it is considered that the laminated structure of the transparent protective film 122 and the transparent insulating film 123 is equivalent to the transparent insulating film of the invention, the inside of the light-transmitting region Gt and the surface groove 123*a* is equivalent to a thin-walled portion of the transparent insulating film. Also, the surface groove 123*a* is equivalent to a thin-walled portion provided in a region along the boundary between adjacent sub-pixels in the invention. In this embodiment, the thin-walled portion in the surface groove 123*a* is formed to be greater in thickness than a thin-walled portion of the light-transmitting region Gt (transmissive display region).

Figure 10A:
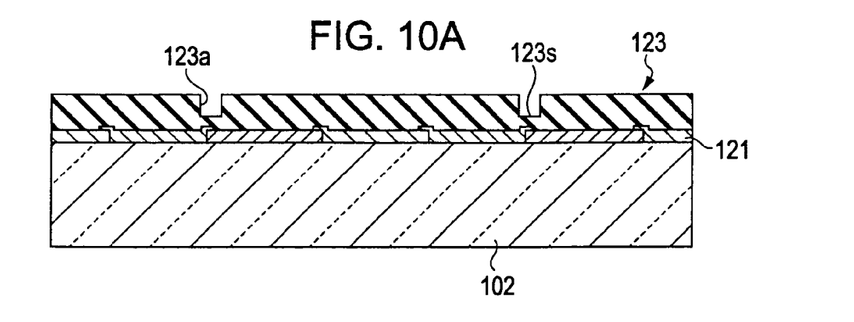
FIGS. 10A and 10B are schematic sectional views showing the structure of a light-reflecting region and a light-transmitting region in a color filter substrate of another embodiment.
Figure 10B:
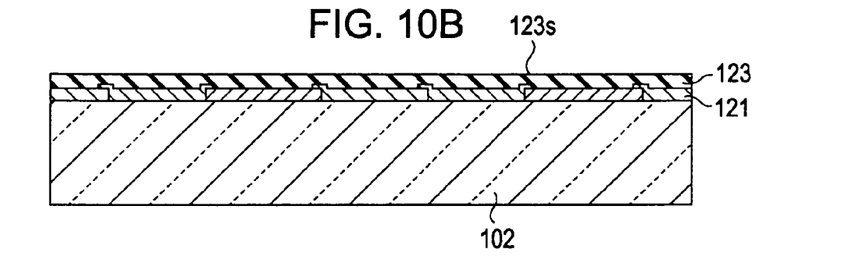

The section structure of a color filter substrate of another embodiment is shown in FIG. 10. Here, FIG. 10A shows the section structure of a light-reflecting region Gr, and FIG. 10B shows the section structure of a light-transmitting region Gt. In this example, any layer equivalent to the transparent protective film 122 does not exist, but the transparent insulating film 123 of a monolayer is directly formed on the color filter 121 (colored layer). Also, a thin-walled portion provided in a region along the boundary between adjacent sub-pixels in the invention is constituted by the surface groove 123*a*. In this structure, the wall thickness of a thin-walled portion 123*s* in the light-transmitting region Gt is equal to the wall thickness 123*s* of a thin-walled portion in the surface groove 123*a*, and these thin-walled portions 123*s* can be simultaneously formed by photolithography, etc.

Figure 11A:
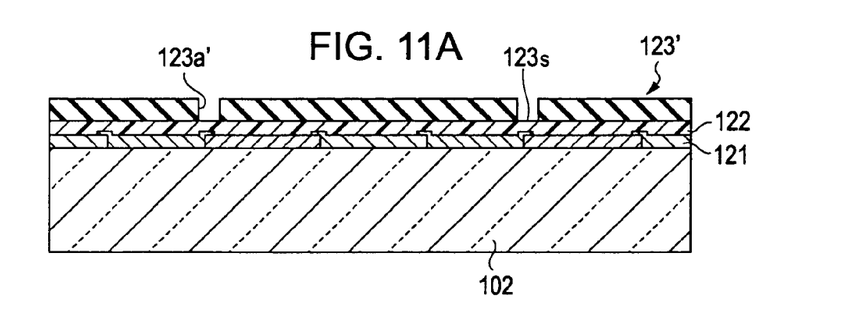
FIGS. 11A and 11B are schematic sectional views showing the structure of a light-reflecting region and a light-transmitting region in a color filter substrate of still another embodiment.
Figure 11B:
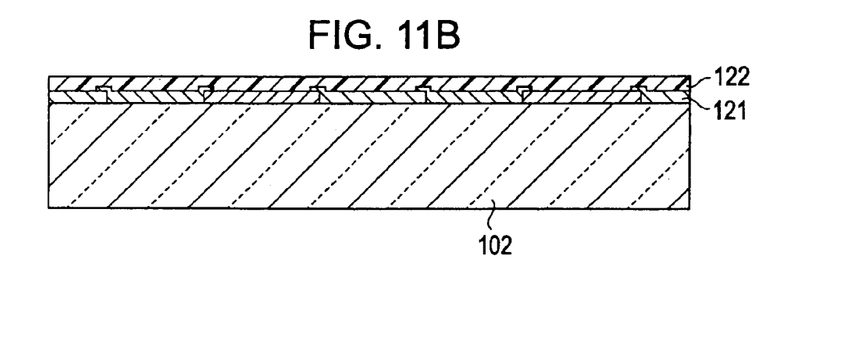

The section structure of a color filter substrate of still another embodiment is shown in FIG. 11. Here, FIG. 11A shows the section structure of a light-reflecting region Gr, and FIG. 11B shows the section structure of a light-transmitting region Gt. This example is the same as the previous embodiment in that the transparent protective film 122 and a transparent insulating film 123' are laminated on the color filter 121 (colored layer), but different from the previous embodiment in that a surface groove 123*a'* is formed by removing the entire transparent insulating film 123' in an upper layer. That is, a bottom face of the surface groove 123*a'* is the surface of the transparent protective film 122 in a lower layer. Even in this example, similar to the example shown in FIG. 10, the wall thickness of a thin-walled portion in the light-transmitting region Gt is equal to the wall thickness of a thin-walled portion in the surface groove 123*a*, and both the wall thicknesses are equal to the wall thickness of the transparent protective film 122.

Figure 12:
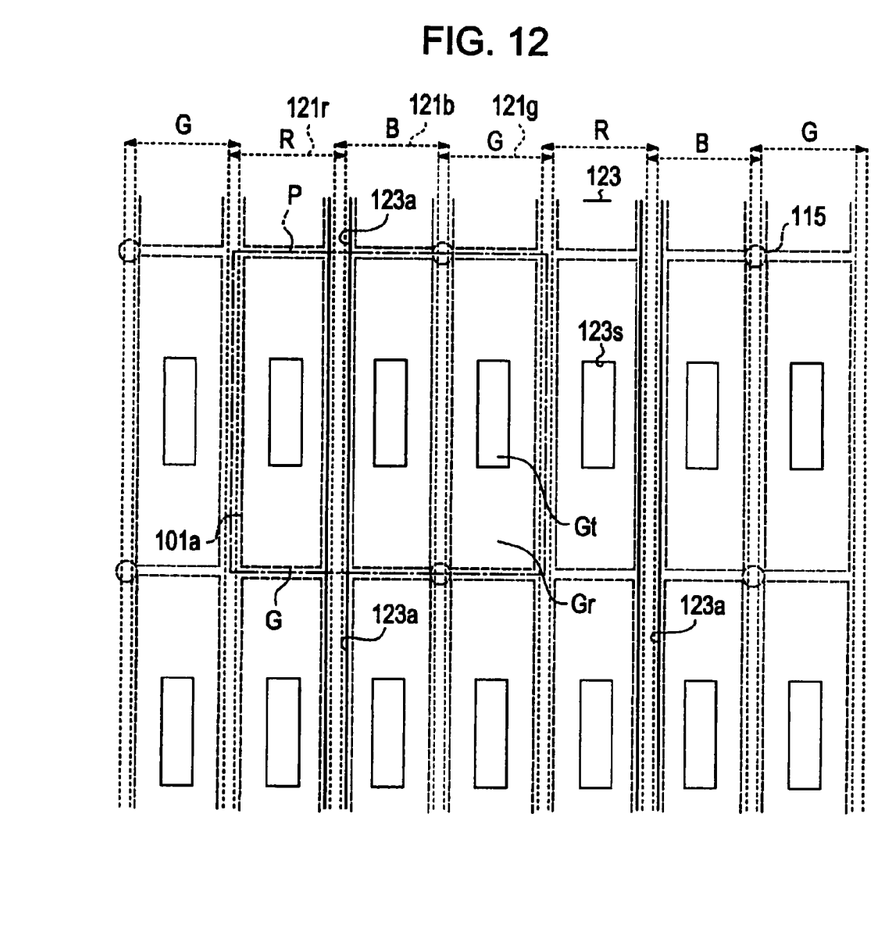
FIG. 12 is a schematic plan view of a color filter substrate of a still further embodiment.

Next, a still further embodiment will be described with reference to FIG. 12. In this embodiment, the light-transmitting region Gt is formed in an island shape in each sub-pixel G, and has a planar structure in which the light-reflecting region Gr surrounds the light-transmitting region Gt. In this configuration, since the light-transmitting region Gt does not continue between adjacent sub-pixels G, the flow of alignment material gets still worse than the previous embodiment.

This example is the same as the previous embodiment in that the surface groove 123*a* is formed in a region along the boundary between sub-pixels. The concrete configuration of the surface groove 123*a* may be the same configuration as the first embodiment, or any of the configurations shown in FIGS. 10 and 11. In this embodiment, since the flowability of alignment material is inherently bad, the effect obtained by providing the surface groove 123*a* that is a thin-walled portion provided in a region along the boundary between sub-pixels in the transparent insulating film 123 is very excellent.

Figure 13:
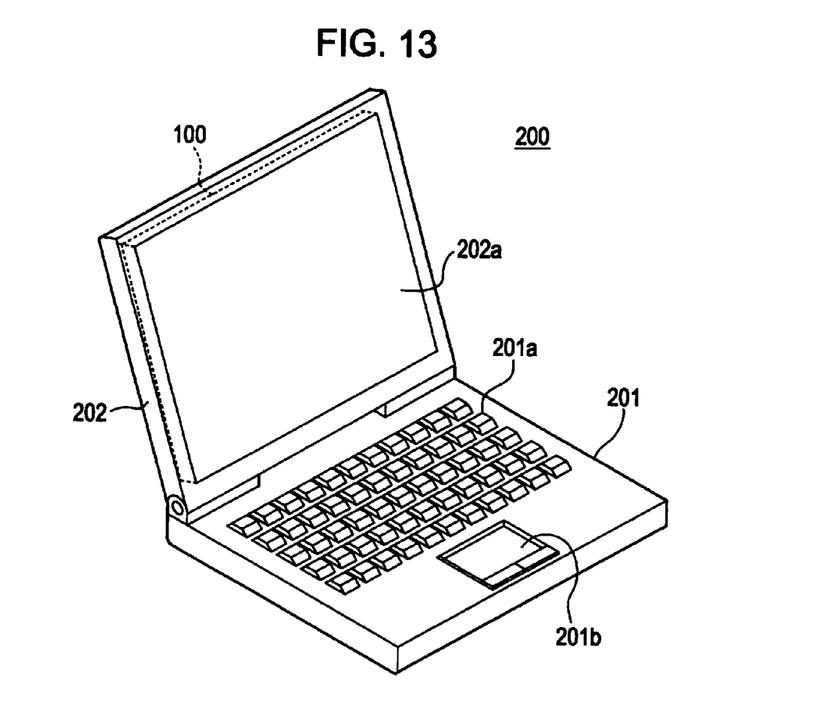
FIG. 13 is a schematic perspective view of an electronic apparatus equipped with the liquid crystal device of the embodiment.
Figure 14:
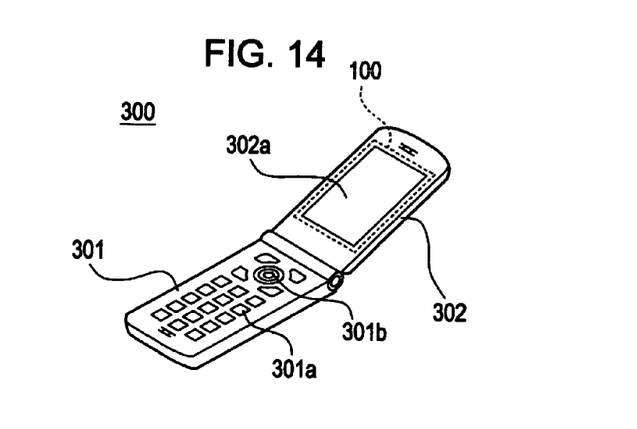
FIG. 14 is a schematic perspective view of another electronic apparatus equipped with the liquid crystal device of the embodiment.

Finally, electronic apparatuses equipped with the liquid crystal device 100 will be described. FIGS. 13 and 14 are schematic perspective views showing electronic apparatuses equipped with the liquid crystal device 100.

FIG. 13 shows a notebook personal computer that is one embodiment of the electronic apparatus according to the invention. This personal computer 200 includes a main body 201 provided with a plurality of operation buttons 201*a* and an operating set 201*b*, and a display unit 202 which is connected to the main body 201 and provided with a display screen 202*a*. In the illustrated example, the main body 201 and the display unit 202 are adapted to be openable and closable. The above-described liquid crystal device 100 is built in the display unit 202, and a desired display image is displayed on the display screen 202*a*. In this case, a display control circuit which controls the liquid crystal device 100 is provided inside the personal computer 200. This display control circuit is adapted to send video signals, other input data, and predetermined control signals to the liquid crystal device 100, and to determine the operation aspect of the liquid crystal device.

FIG. 14 shows a portable telephone that is another embodiment of the electronic apparatus according to the invention.

The portable telephone 300 shown in this figure has an operation unit 301 provided with a plurality of operation buttons 301a and 301b, a mouthpiece, etc., and a display unit 302 provided with a display screen 302a, an earpiece, etc., and the liquid crystal device 100 is incorporated into the display unit 302. Also, a display image formed by the liquid crystal device 100 can be visually recognized in the display screen 302a of the display unit 302. In this case, a display control circuit which controls the liquid crystal device 100 is provided inside the portable telephone 300. This display control circuit is adapted to send video signals, other input data, and predetermined control signals to the liquid crystal device 100, and to determine the operation aspect of the liquid crystal device.

In addition, it is needless to say that the liquid crystal device and electronic apparatus of the invention are not limited to the above-described illustrated examples, but various changes, modifications, and alternations can be made thereto without departing from the subject matter of the invention. For example, although the section of the surface groove 123a of the illustrated example is formed in a rectangular (square or oblong) shape and the inner bottom portion 123x is formed flatly, this is merely exemplary, and the surface groove may not have such a flat inner bottom portion 123x in practice. For example, the surface groove may have various cross-sectional shapes, such as a U-shape, a V-shape, and a W-shape.

The entire disclosure of Japanese Patent Application No:2005-269657, filed Sep. 15, 2005 is expressly incorporated by reference herein.

What is claimed is:

1. A liquid crystal device comprising:
a pair of substrates,
liquid crystal sandwiched between the pair of substrates,
a plurality of sub-pixels, each sub-pixel having a transmissive display region and a reflective display region;
a color filter disposed on the one of the substrates;
a transparent insulating film disposed between the liquid crystal and the color filter and being provided in the transmissive display region and the reflective display region, so as to define a first layer thickness of the liquid crystal in the reflective display region and a second layer thickness of the liquid crystal in the transmissive display region, the first layer thickness being smaller than the second layer thickness, the transparent insulating film including:
a first thin-walled portion provided in the transmissive display region;
a second thin-walled portion that is thicker than the first thin-walled portion, the second thin-walled portion provided in the reflective display region in a region along a boundary between the adjacent sub-pixels; and
a surface groove formed in the transparent insulating film disposed in the reflective display region, the surface groove having a depth in the range of 30% to 90% of a thickness of the transparent insulating film for improving alignment of the liquid crystal, the surface groove being provided in the region along the boundary between the adjacent sub-pixels of the second thin-walled portion, the surface groove arranged corresponding to a period of plural sub-pixels; and
an orientation film disposed on the transparent insulating film and within the surface groove.

2. The liquid crystal device according to claim 1,
wherein the transmissive display region is provided in the shape of an island within a pixel, and a periphery of the transmissive display region is surrounded by the reflective display region.

3. The liquid crystal device according to claim 1,
wherein the transparent insulating film has at least a double-layer structure, and the second thin-walked portion provided in the region along the boundary between the sub-pixels is formed, leaving at least a lowermost layer.

4. The liquid crystal device according to claim 1, wherein the second thin-walled portion provided in the region along the boundary between the sub-pixels is opened to the transmissive display region.

5. The liquid crystal device according to claim 1,
wherein a width of the second thin-walled portion provided in the region along the boundary between the sub-pixels is within a range of 10 to 19 μm.

6. The liquid crystal device according to claim 1,
wherein pixels including a plurality of the sub-pixels in which colored layers of a plurality of colors are disposed, respectively, are periodically arranged in an effective driving region, and
wherein the second thin-walled portions each provided in the region along the boundary between the adjacent sub-pixels are periodically arranged corresponding to an arrangement period of the pixels.

7. The liquid crystal device according to claim 6, wherein the second thin-walled portion provided in the region along the boundary between the adjacent sub-pixels is provided between a blue color filter and a red cool filter.

8. The liquid crystal device according to claim 1, wherein the surface groove is arranged corresponding to a period of three sub-pixels.

9. An electronic apparatus comprising the liquid crystal device according to claim 1.

10. A liquid crystal device comprising a pair of substrates, liquid crystal sandwiched between the pair of substrates, and a plurality of sub-pixels arranged in a row direction and a column direction, each sub-pixel having a transmissive display region and a reflective display region,
wherein one of the substrates has a color filter and a transparent insulating film disposed on the one of the substrates, the transparent insulating film arranged closer to the liquid crystal than the color filter and being provided in the transmissive display region and the reflective display region,
wherein the transparent insulating film has a first thin-walled portion provided in the transmissive display region, the first thin-walled portion having a film thickness that is thinner than a film thickness of the transparent insulating film provided in the reflective display region,
wherein the transparent insulating film has a second thin-walled portion provided in the reflective display region in a region along a boundary between the adjacent sub-pixels in the row direction and a region along a boundary between the adjacent sub-pixels in the column direction, the second thin-walled portion having a film thickness that is thinner than the film thickness of the transparent insulating film provided in the reflective display region,
wherein a surface groove is formed in the transparent insulating film disposed in the reflective display region and a depth of the surface groove is in the range of 30% to 90% of a thickness of the transparent insulating film for improving alignment of the liquid crystal, the surface groove arranged corresponding to a period of plural sub-pixels;
wherein an orientation film is disposed on the transparent insulating film and within the surface groove; and wherein the layer thickness of the liquid crystal in the reflective display region is smaller than the layer thickness of the liquid crystal in the transmissive display region in consideration of the first thin-walled portion and the second thin walled portion.

11. A method of manufacturing a liquid crystal device including a pair of substances, liquid crystal sandwiched between the pair of substrates, and a plurality of sub-pixels, each sub-pixel having a transmissive display region and a reflective display region, the method comprising:

forming a color filter on one of the substrates, forming on the color filter a transparent insulating film which has (1) a first thin-walled portion provided in the transmissive display region, the first thin-walled portion having a film thickness thinner than a film thickness of the transparent insulating film provided in the reflective display region and (2) a second thin-walled portion provided in the reflective display region in a region along a boundary between the adjacent sub-pixels, the second thin-walled portion having a film thickness that is thinner than the film thickness of the transparent insulating film provided in the reflective display region, wherein a surface groove is formed in the transparent insulating film disposed in the reflective display region and a depth of the surface groove is in the range of 30% to 90% of a thickness of the transparent insulating film for improving alignment of the liquid crystal, the surface groove arranged corresponding to a period of plural sub-pixels; and disposing an uncured alignment material on an inner surface of one of the substrates.

12. The method of manufacturing a liquid crystal device according to claim 11, wherein the alignment material flows within the second thin-walled portion of the transparent insulating film in the step of disposing the alignment material.

13. The method of manufacturing a liquid crystal device according to claim 11, wherein, in the step of forming a transparent insulating film, the transparent insulating film and the second thin-walled portion are formed by disposing photosensitive resin on an inner surface of one of the substrates, and subjecting exposure treatment and development treatment to the photosensitive resin.

14. The method of manufacturing a liquid crystal device according to claim 11, wherein the step of forming a transparent insulating film includes forming a first transparent insulating layer in a region where the transparent insulating film is formed, and forming a second transparent insulating layer in a region on the first transparent insulating layer other than the second thin-walled portion.

15. The method of manufacturing a liquid crystal device according to claim 11, wherein a width of the second thin-walled portion provided in the region along the boundary between the sub-pixels is within a range of 10 to 19 μm.

* * * * *